United States Patent [19]

Kampe et al.

[11] Patent Number: 5,953,010
[45] Date of Patent: Sep. 14, 1999

[54] USER-FRIENDLY ICONIC MESSAGE DISPLAY INDICATING PROGRESS AND STATUS OF LOADING AND RUNNING SYSTEM PROGRAM IN ELECTRONIC DIGITAL COMPUTER

[75] Inventors: Mark Kampe, Los Angeles; Jordan Brown, Sylmar; Sherif Kottapurath, Los Angeles; Jonathan Broome, Long Beach, all of Calif.

[73] Assignee: Sun Microsystems, Inc., Palo Alto, Calif.

[21] Appl. No.: 08/904,704

[22] Filed: Aug. 1, 1997

[51] Int. Cl.$^6$ ............................... G06F 3/14; G06F 9/445
[52] U.S. Cl. ......................... 345/348; 345/349; 345/966; 395/704; 395/712
[58] Field of Search ...................................... 345/348, 349, 345/347, 966, 975, 140, 440; 395/712, 704, 705

[56] References Cited

U.S. PATENT DOCUMENTS

| | | | |
|---|---|---|---|
| 5,301,348 | 4/1994 | Jaaskelainen | 395/183.22 |
| 5,333,256 | 7/1994 | Green et al. | 345/349 |
| 5,448,739 | 9/1995 | Jacobson | 395/680 |
| 5,469,573 | 11/1995 | McGill, III et al. | 395/712 |
| 5,630,081 | 5/1997 | Rybicki et al. | 345/349 |
| 5,649,085 | 12/1994 | Lehr | 345/440 |
| 5,673,404 | 12/1995 | Cousins et al. | 345/357 |

*Primary Examiner*—Raymond J. Bayerl
*Assistant Examiner*—Cuong T. Thai
*Attorney, Agent, or Firm*—Arter & Hadden LLP; David G. Alexander

[57] ABSTRACT

A computer system program including an operating system and a plurality of system service modules generates a number of status messages representing selected milestone events while it is being loaded and run, including progress advisories and technical advisories. User-friendly icons are displayed on a display monitor in response to the progress advisories, indicating which milestone event is occurring and how much of the event has been completed. If there is a failure in loading the system program, a user can provide service personnel with an accurate evaluation of the system condition by reporting which icon was displayed last on the monitor. Technical advisories such as audit records which are not relevant to a user are stored as entries in a silent log for possible later use by service personnel. In response to a technical advisory indicating a partial or fatal load failure, a iconic or text message is displayed which instructs a user to take one or more actions, such as reporting the failure to a system administrator or service center.

45 Claims, 5 Drawing Sheets

PARTIAL MEMORY FAILURE

REPORT PROBLEM TO SERVICE
CENTER AT (555) 1234

PRESS (ENTER) TO OPERATE WITH
REDUCED CAPACITY

FIG. 8

NETWORK SERVER
RESPONDING SLOWLY

EXPECT DELAYS

CALL SYSTEM ADMINISTRATOR AT
(555) 1212 FOR STATUS OF SERVER

FIG. 9

PRINTER DRIVER NOT FOUND

WILL BE UNABLE TO PRINT

REPORT PROBLEM TO
SERVICE CENTER AT (555) 1234

USER-FRIENDLY ICONIC MESSAGE DISPLAY INDICATING PROGRESS AND STATUS OF LOADING AND RUNNING SYSTEM PROGRAM IN ELECTRONIC DIGITAL COMPUTER

BACKGROUND OF THE INVENTION

1. Field of the Invention

The present invention generally relates to the art of electronic digital computers, and more specifically to a user-friendly iconic message display indicating the progress and status of loading and running a system program in an electronic digital computer.

2. Description of the Related Art

Modern computer system programs which include an operating system per se, system service modules, service "daemons" and other modules are generally "message-rich" in that they generate a large number of status messages while the system program is being loaded and run. These messages are displayed on the screen of a video monitor as text.

Most of these messages contain numerical data or other highly technical information which is not useful or relevant to a typical user. Even if the information were relevant, the messages are displayed too briefly for a user to comprehend or benefit from them.

Generally, these messages will be of two types: progress advisories which indicate the progress of loading the system program, and technical advisories which include audit data for possible use by service personnel and warnings that a partial or total failure has occurred. An exemplary progress advisory message might be "MSDEX.DRV LOADED AT 0x4F895C3D", whereas a technical advisory indicating a failure might be "ERROR 17F6 AT 0x8B2976A9".

The purpose of the progress advisory messages is presumably to advise a user of the status and progress of loading the system program, whereas the purpose of the technical advisory messages relating to failures is to inform a user as to which module of the system failed and the type of failure. However, these messages fail to achieve their intended purpose because the "language" in which they are presented is unintelligible to a typical user.

SUMMARY OF THE INVENTION

The present invention overcomes the drawbacks and limitations of the prior art by converting a system program which originally produced a text-based startup message display into a graphical startup message display which generates and displays user-friendly iconic messages representing milestone events that are readily intelligible to a typical computer user. The icons are updated every few seconds and accurately indicate the progress of loading and running the system program as well as indicating any failures and corresponding actions that should be taken.

More specifically, an electronic digital computer according to the present invention is programmed with a system program including an operating system and a plurality of system service modules which generate a number of status messages representing selected milestone events while it is being loaded and run, including progress advisories and technical advisories. User-friendly icons are displayed on a display monitor in response to the progress advisories, indicating which milestone event is occurring and how much of the event has been completed.

If there is a failure in loading the system program, a user can provide service personnel with an accurate evaluation of the system condition by reporting which icon was displayed last on the monitor.

Technical advisories such as audit records which are not relevant to a user are stored as entries in a silent message log for possible later use by service personnel. In response to a technical advisory indicating a partial or fatal load failure, a iconic or text message is displayed which instructs a user to take one or more actions, such as reporting the failure to a system administrator or service center.

In one embodiment of the invention, text messages which are generated by the system program are intercepted and processed to generate the iconic and technical advisories that are transmitted to the display monitor and the silent log. In another embodiment of the invention, program code is incorporated into the system program which directly causes icons to be generated and transmitted to the monitor, and directly causes technical advisories to be stored in the message log.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
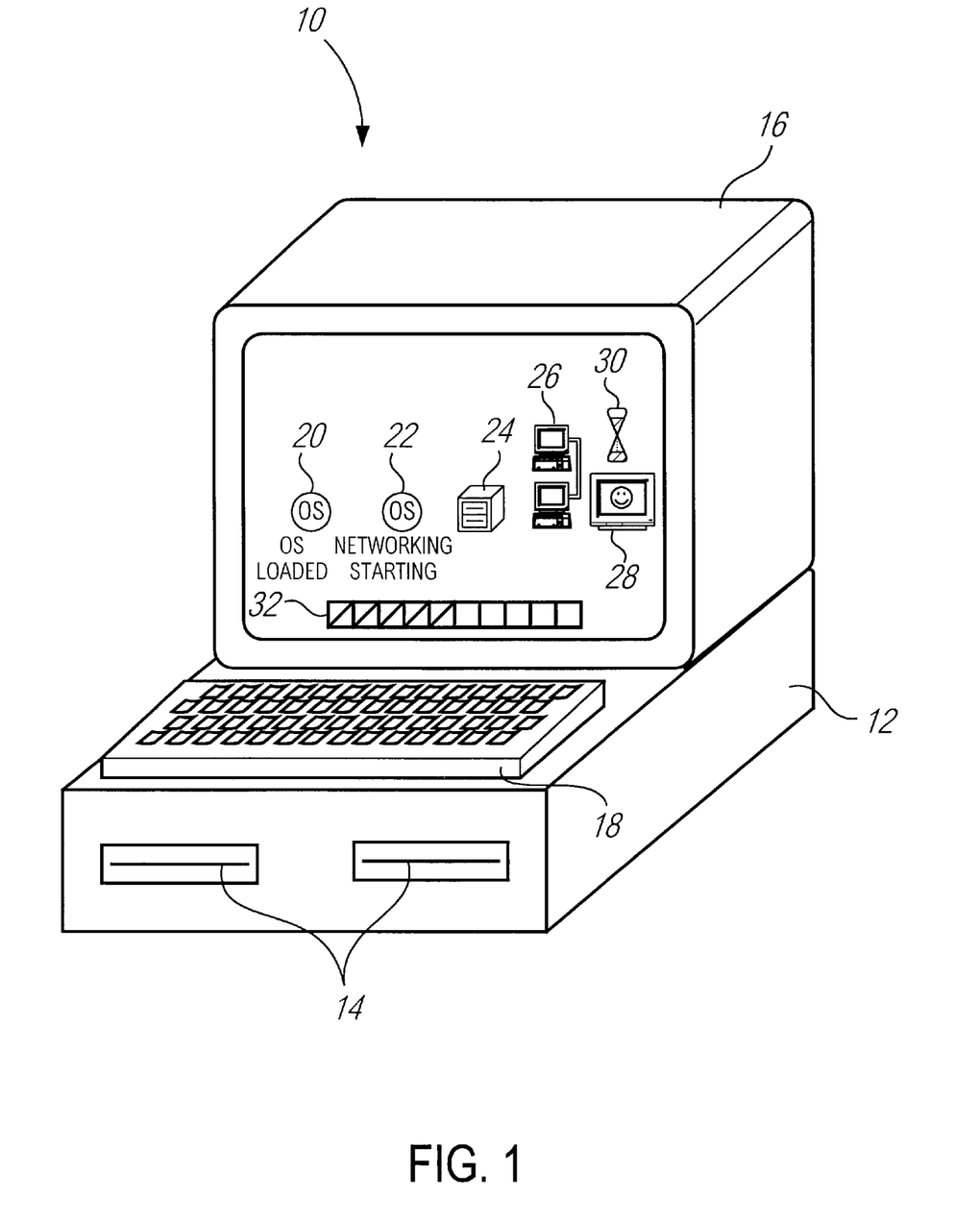
FIG. 1 is a perspective view of an electronic digital computer which is programmed with a system program according to the present invention.

FIG. 1 illustrates an electronic digital computer 10 which is programmed with a system program according to the present invention as will be described in detail below. The computer 10 includes a motherboard 12 which is provided with one or more magnetic disk drives, CD-ROM optical drives, or other digital data storage devices 14.

Although not explicitly illustrated, the motherboard 12 is also provided with conventional elements of an electronic digital computer, including a central processing unit (CPU), non-volatile (ROM) and volatile (RAM) electronic memory, an input/output interface, etc. The computer 10 also includes a display unit 16 in the form of a video monitor, and a keyboard 18 for data entry.

The system program is provided as software including digital instruction and data code that implements the required functionality. The system program generally comprises a main module including an operating system per se having a "kernel", as well as a number of additional functional modules such as system service modules, service "daemons", drivers, libraries, etc.

For the purpose of the present invention, the system program can be considered as including the operating system and/or any system service or other modules which are normally loaded and run prior to executing an application program.

In the example of FIG. 1, the system program includes an operating system which can include any combination of core functions, libraries, etc. The operating system is represented by an icon such as a hourglass 30 on the display unit 16 when it has been initially found by a boot loader and is in the process of being loaded, and by an icon 20 after loading has been successfully completed.

After the operating system has been loaded, system services such as networking are loaded in a serial manner. Successful initialization of loading these system services is indicated by, for example, an icon 22. The system program further includes system service modules including file services, network services and video services which are represented by icons 24, 26 and 28 respectively. Further illustrated in FIG. 1 is a strip gage progress indicator icon 32.

As will be described in detail below, the system program generates a large number of text status messages as it is being loaded and run. In a first embodiment of the invention, these messages are intercepted, and the icons 20 to 32 are generated and displayed rather than the text messages. In a second embodiment of the invention, selected text messages in the system program are replaced by invocations to display icons as illustrated in FIG. 1.

In either case, the icons represent milestone events in the loading and running of the system program. Although thousands of text messages may be generated in the conventional manner, only a few icons corresponding to selected messages will be generated in accordance with the present invention. These icons are updated every few seconds or the like so that the user can be apprised of the progress of loading the system program in a user-friendly and useful manner.

A key aspect of the invention is that the regular progress updates are produced, preferably every few seconds, so that the user is given satisfactory assurance that startup is proceeding as it should. A long delay on the order of 20 to 40 second for one icon, while within the scope of the invention, is less preferred as it might leave the user unsure as to whether or not the system is still working.

Generally, as a milestone event in the loading of the system program occurs, a corresponding icon will be displayed on the unit 16. The icon will have a certain appearance at the beginning of the event, and a different appearance when the event has been successfully completed. The color, size and/or shape of the icon can change.

For example, when a milestone event has begun and is in progress, the hourglass icon 30 can be displayed, and when the event has been completed, the icon 30 can be replaced by an icon representing the event itself such as the icons 20 to 28. Various other examples of iconic representations will be described below.

Generally, the system program includes a number of major modules such as system service modules which are loaded serially. Each module can include a large number of sub-modules, and a typical system program can include thousands of individual modules. A milestone event will typically be constituted by the loading of one or more major modules, although the invention is not limited to any particular criterion for selection of milestone events.

The icons 30 and 32 can represent the progress of loading a current module or modules which constitute a milestone event, or the progress of loading the entire system program. Alternatively, the icons 30 and 32 can be used in combination, with one of them indicating the progress of loading a current module, and the other indicating the progress of loading the entire system program. The icons 20 and 22 differ in that they each represent completion of a unique event, rather than an event in progress, with the icon 20 indicating that the operating system has been loaded, and the icon 22 indicating that initialization of loading the networking system services has been completed.

It is further within the scope of the invention to provide specific icons for certain events, and a strip gage for events which are relatively devoid of particular milestones (either because there are none, or because they are uninteresting).

The iconic display as illustrated in FIG. 1 provides a user-friendly method of informing a user of the progress of loading the system program, including which milestone events have occurred (e.g. which major modules have been loaded) and how much of a current module and/or the entire system program has been loaded. As the system loads, all of the icons corresponding to completed milestone events (e.g. loaded major modules) can remain on the monitor, or alternatively only the icons for a currently loading module and a last loaded module can be displayed.

As illustrated in FIG. 1, it will be assumed that the strip gage icon 32 represents the progress of loading the entire system program, and that the hourglass icon 30 represents the progress of loading a current module, which as shown in the drawing is the display services module represented by the icon 28.

The strip gage icon 32 is a moving indicator which changes appearance, e.g. changes from clear to dark or colored from right to left, in accordance with the amount or percentage of the system program which has been loaded. The icon 32 indicates that approximately 50% of the system program has been loaded. This includes sequentially loading the operating system, file services and network services as indicated by the icons 20, 22, 24 and 26.

The hourglass icon 30 (which could be replaced by a stopwatch or other applicable icon) includes a simulated substance that moves from the upper chamber to the lower chamber to indicate the progress of loading the current module, which is the display services module as represented by the icon 28. Upon successful loading and running of the entire system program, a suitable message will be displayed, the system program will launch a startup application program, etc. in a conventional manner. Another contemplated implementation of the hourglass icon 30 is to make it static, and flash at a low frequency such as ½ to 2 times per second.

The present invention not only enables a typical user to know the progress of loading the system program, but also provides a user-friendly method of determining at which point in the loading process a failure occurred and accurately reporting the failure to service personnel. For example, if the system locked up or otherwise failed with the icon 26 being the last icon displayed, the user can report to the service personnel that the system failed while loading the network services module, or "while the picture of the two computers connected together was being displayed".

Figure 2:
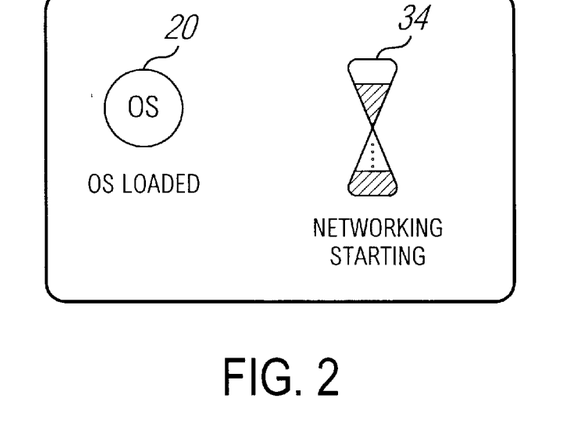
FIGS. 2 to 4 are diagrams illustrating alternative iconic displays according to the invention.

Numerous alternative iconic displays are contemplated within the scope of the present invention. For example, as illustrated in FIG. 2, the icon for a module which is currently loading can be an hourglass or other progress indicator such as indicated at 34, with or without a legend such as "NETWORKING STARTING". After loading of the network services has been initialized, the hourglass icon 34 will change to an icon such as designated by the numeral 22 in FIG. 1.

Figure 3:
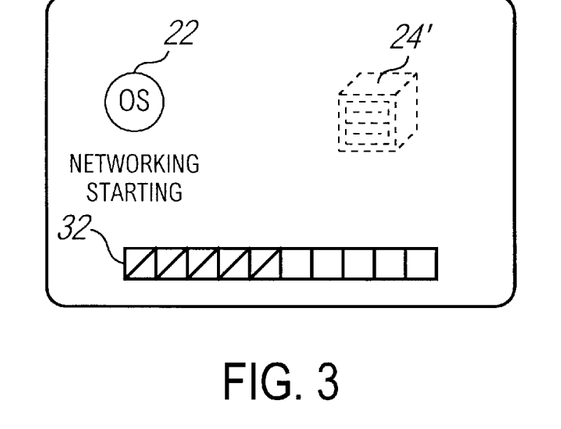

Another exemplary iconic display is illustrated in FIG. 3, in which the icon 20 has been deleted from the display and replaced by the icon 22 after initialization of loading the networking services has been successfully completed. Loading of the file services is indicated by an icon 24', which has the same general appearance as the icon 24 but a different color or other attribute as illustrated in phantom line. The strip gage 32 indicates that loading of the file system has been approximately 50% completed.

Figure 4:
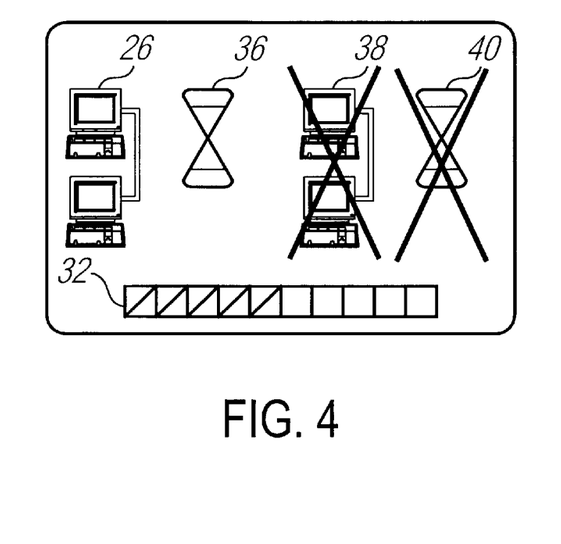

FIG. 4 illustrates another exemplary iconic display, in which the operating system, file services and network services modules have been loaded, and the display services module is currently loading. The icon 26 for the network services module, which was the last successfully loaded module, is displayed, with the previous icons being deleted. The display services module is represented by a simple hourglass 36, which does not provide a progress advisory but merely indicates that the next module is loading. The progress is indicated by the strip gage 32.

If the system were to fail at this point, a user could report to service personnel that the last icon displayed was an hourglass, and that the one before that was a picture of two computers connected together. From this, the service person can accurately determine that the system failed after loading the network services module and while loading the display services module.

The use of progress icons as described above produces a much simpler and friendlier indication of the progress of a normal system startup. If, however, a serious problem is encountered, simple icons may be inadequate to convey to the user the nature of the problem and what actions might be required. In such cases, it is appropriate to produce textural messages; but only if the messages are (a) actually required (in order to inform the user that he must take some action) and (b) appropriate to (understandable by) the intended user.

The scope of the present invention also includes generating and displaying iconic messages in response to failure conditions. For example, in response to failure of a module to successfully load, the icon for the module can be redisplayed with an "X" or other mark thereon as indicated at 38 or 40 in FIG. 4, or can be replaced with another icon such as an exploding bomb.

Figure 5:
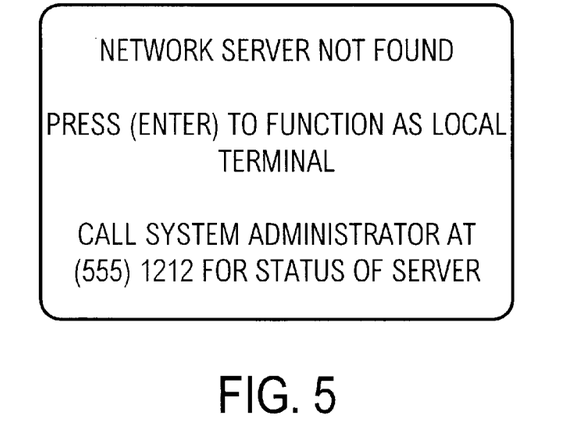
FIGS. 5 to 10 are diagrams illustrating alternative text displays according to the invention.

In addition to providing progress and failure condition advisories, the present invention also provides iconic text messages corresponding to failure or error conditions which instruct the user as to what action to take to correct the error condition. FIG. 5 illustrates a message that is generated in response to a status message indicating a warning condition. In this example, the operating system did not find the network server. This could result from a failure of the network server itself, a communication problem, etc.

The condition represented by FIG. 5 is a serious, but survivable error. In this case, the message indicates the type of error, provides a prompt that enables the user to press the ENTER key to boot locally and function as a local terminal, and also provides a telephone number of the system administrator whom the user can call to determine the reason the network server did not respond and when network service can be expected to be restored.

Figure 6:
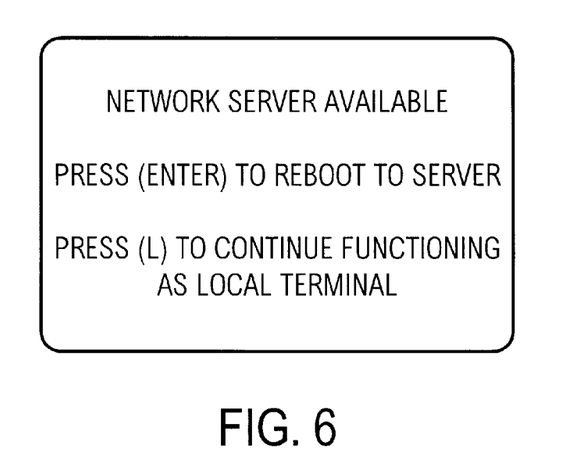

Preferably, the present invention, in response to a condition such as illustrated in FIG. 5, will automatically attempt to restore full operation in the event of a serious but survivable error. In the illustrated example, the system program will periodically poll the network server and attempt to establish communication. Upon successful completion of this operation, a message such as illustrated in FIG. 6 will be displayed which prompts a user to take one of a plurality of possible actions, in this case reboot to the server or continue to function locally.

Figure 7:
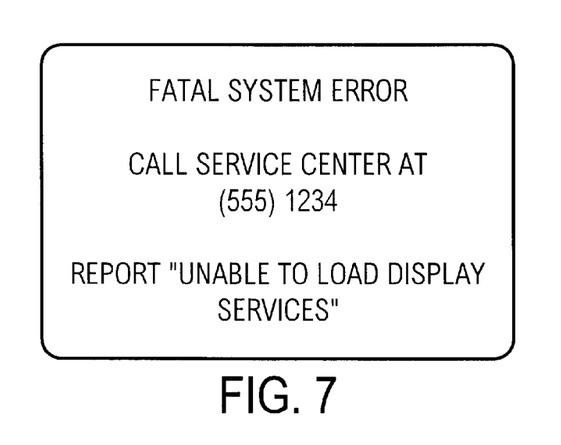

FIG. 7 illustrates a text message that can be generated in response to a fatal system error. It will be noted that certain fatal errors will result in total failure of the system such that an advisory message cannot be generated, and that handling such a condition is beyond the scope of the invention. In the illustrated example, the message describes the error, provides a telephone number for a service center, and instructs the user what he should report to the service personnel at the center.

Figure 8:
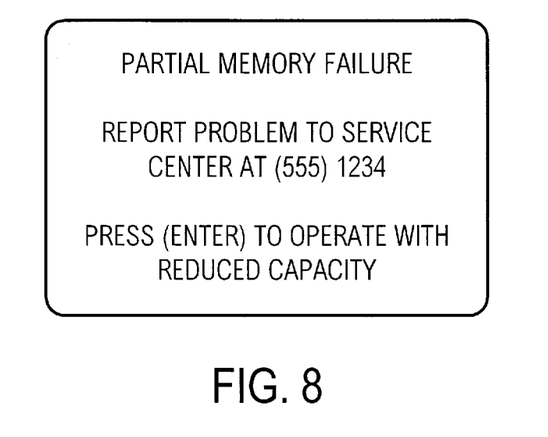
Figure 9:
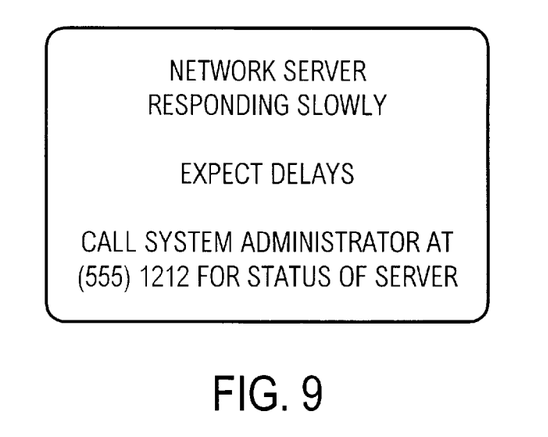
Figure 10:
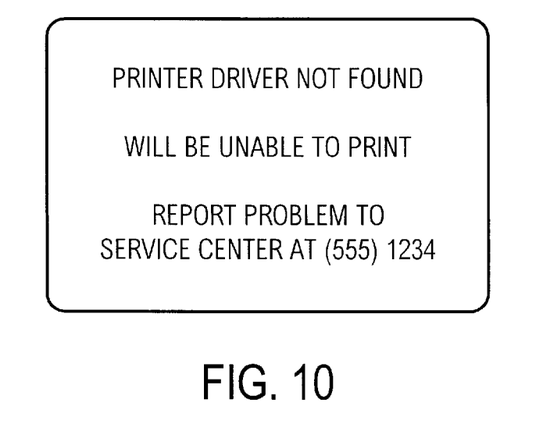

FIG. 8 illustrates another case of a serious but survivable error, which again prompts the user to take appropriate action. The message will remain displayed until the user depresses the ENTER key. FIG. 9 illustrates a warning advisory which is generated in response to an inordinate delay. Such a message will typically be displayed for a suitable period of time, such as 5 to 10 seconds. Another example of a serious but survivable error is illustrated in FIG. 10.

Although not explicitly illustrated, another alternative is to display a message that requires confirmation, including a phrase such as "PRESS ENTER TO CONFIRM". For example, a confirmation for the printer problem illustrated in FIG. 10 might be preferable, whereas a brief warning for the slow server response as illustrated in FIG. 9 would be sufficient.

Figure 11:
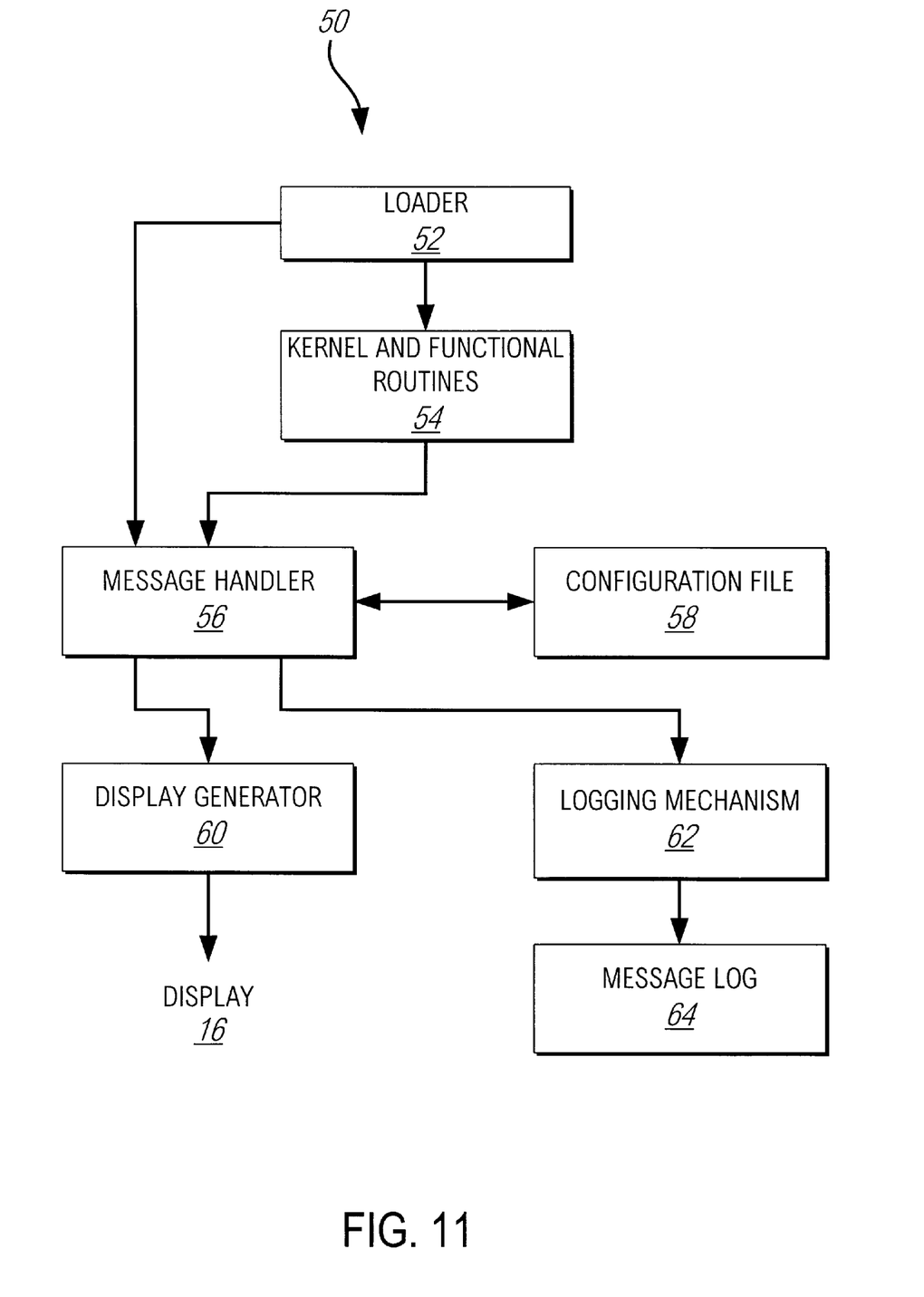
FIG. 11 is a block diagram illustrating a system program according to the invention.

A system program 50 according to a first embodiment of the present invention is illustrated in FIG. 11. In this embodiment, a large number of text messages are generated, and a relatively small number of these messages are intercepted and processed to generate iconic and text displays as described above.

The system program 50 includes a boot loader 52 which loads and runs a main module 54 which includes the operating system or kernel per se, as well as other system service functional modules such as the file services, network services and display services.

As the system program 50 is being loaded and run, the loader 52 and module 54 generate a large number of text status messages as described above which are intercepted by a message handler 56 before they can reach the display unit 16. The message handler 56, in conjunction with a configuration table or file 58, generates iconic messages that are transmitted to the display 16 via a display generator 60, and log entries that are transmitted to a silent message log 64 via a logging mechanism 62.

The system program 50 is provided on one or more electronic digital data storage media. Typically, the system program 50 will be distributed to end users on one or more optical storage media such as CD-ROMS, magnetic storage media such as floppy disks, or a combination thereof. Alternatively, the system program 50 can be downloaded from a hard drive or other digital storage medium on a network server or internet site.

The system program 50 is loaded into a user's computer in which it typically resides in a combination of volatile memory (RAM) and mass storage (e.g. magnetic hard drive) during operation. Components of the system program 50 can be paged or otherwise dynamically transferred between volatile memory and mass storage depending on the configuration of the system 50.

As described above, the loader 52 and module 54 normally generate text status messages which are unintelligible to a typical user as the system program 50 is loaded and run. These messages are intercepted and handled by the message handler 56. Various mechanisms can be implemented within the scope of the invention to accomplish this function. For example, system calls which would normally be directed to the driver software for the display unit 16 can be revectored to point to the message handler 56.

Alternatively, boot code in the loader 52 can be changed to cause an interrupt which points to the message handler 56 whenever a system call for display services is generated. As yet another exemplary alternative, all status messages can redirected to the logging mechanism 62, which will invoke the message handler 56 in response to logging of a status message in the message log 64.

When a status message is generated, the message handler 56, in combination with the configuration file 58, determine what type of condition is indicated by the message. These components are programmed to define and classify status messages into, for example, the following types.

1. Fatal errors.
2. Serious but survivable errors.
3. Inordinate delays.
4. Advisory warnings.
5. Audit records.
6. Progress advisories.

Message types 1 to 5 are technical advisories, whereas type 6 is a progress advisory. Types 1 to 4 indicate various severities of alerts, whereas type 5 messages provide information that might be of value to a service person at a later time.

The configuration file 58 includes a list of status messages which are generated by the system program during loading and execution and which are to be handled by the message handler 56. These can include all possible messages, or a subset of all messages. In the latter case, any message which is not in the designated subset is ignored.

As another implementation of the invention, rather than enumerating all possible messages in each class, the configuration file 58 can describe "rules" that enable the message handler 56 to recognize and characterize broad classes of messages, without having to enumerate all of the individual instances. One contemplated rule implementation is to allow wild-card regular expressions to be used.

The configuration file 58 provides a mapping of status messages and corresponding actions that should be taken by the message handler 56. The entries in the configuration file 58 can include an argument indicating the type of status message, or can alternatively include discrete program code which tells the message handler 56 what to do in response to the message. The file 58 will generally contain entries only for those messages corresponding to milestone events. If an entry for a message is not found in the file, the message is ignored.

In the case of a type 6 (progress advisory) message, the configuration file 58 will include a designation of an icon which the message handler 56 should control the display generator 60 to generate and transmit to the display unit 16. Generally, the loader 52 or module 54 will generate a first or start status message when a milestone event (e.g. loading of a major module or plurality of modules) begins, and a second or end status message when event is completed. The message handler 56 controls the display generator 60 to display the icon as having a first appearance (color, size, shape, etc.) in response to the start message, and a second appearance upon successful loading of the module as described above with reference to FIGS. 1 to 4.

The message handler 56 also controls the display generator 60 to update the progress indicator icons at periodic intervals of, for example, every 1 to 5 seconds. This can be done in any suitable manner, such as by determining a starting address, an ending addresses and a current address pointer of the module in memory, using these values to calculate the percentage of the module that has been loaded, and updating the progress indicator to correspond to the calculated percentage. Alternatively, the status messages can represent milestones in a module which are predetermined to correspond to percentages of program code of the module which has been loaded.

Another method of estimating progress is to count the number of seconds elapsed as a percentage of the nominally required time. For example, if an event is estimated to take 5 seconds to complete, each elapsed second will constitute a 20% increment of progress. This alternative is especially suited for processes that are not as readily measurable, such as loading data into memory.

Type 1 to 5 messages can all be logged into the message log 64 if desired. The messages can be logged verbatim, or the configuration file 58 can be set up to translate the messages into a more desirable form. Alternatively or additionally, the message handler 56 and configuration file 58 can be set up to generate text warning messages in response to selected or all type 1 to 4 messages as described above with reference to FIGS. 5 to 10. Such text messages are generated in a manner similar to the iconic messages, but using the configuration file 58 to map an incoming status message with an action to be taken.

In a second embodiment of the present invention, the message handler 56 and configuration file 58 are omitted, and their functionality is implemented in the loader 52 and main module 54 themselves. More specifically, program code is incorporated into the loader 52 and module 54 which directly causes the display generator 60 to generate and transmit icons corresponding to progress advisories to the display 16, and directly causes the logging mechanism 62 to store technical advisories in the message log 64.

In summary, the present invention overcomes the drawbacks and limitations of the prior art by providing a system program which is configured to generate and display user-friendly iconic and text messages that are readily intelligible to a typical computer user, and accurately indicate the progress of loading and running the system program as well as indicating any failures and corresponding actions that should be taken.

Various modifications will become possible for those skilled in the art after receiving the teachings of the present disclosure without departing from the scope thereof. For example, the system program can be adapted to automatically call a service center and transmit a message thereto in response to a system loading error.

What is claimed is:

1. In a programmed electronic digital computer including a display unit, a system program comprising:
   program code configured to generate status messages representing progress advisories and technical advisories as the system program is loaded and run in the computer;
   a display generator configured to generate and transmit icons corresponding to status messages representing progress advisories to the display unit;
   a message log; and
   a logging mechanism configured to store status messages representing technical advisories in the message log.

2. A computer as in claim 1, in which the system program further comprises a message handler configured to receive status messages, determine if they are progress advisories or technical advisories, transmit status messages representing progress advisories to the display generator, and transmit status messages corresponding to technical advisories to the logging mechanism.

3. A computer as in claim 1, in which the status messages representing progress advisories correspond to milestone events in the loading and running of the system program.

4. A computer as in claim 3, in which the status messages and progress icons representing progress advisories are selected to replace a larger number of text status messages.

5. A computer as in claim 3, in which:
the system program comprises a plurality of modules; and
the milestone events correspond to beginning and completion of loading and running selected modules.

6. A computer as in claim 5, in which the modules comprise an operating system and at least one system service module.

7. A computer as in claim 3, in which the icons comprise;
a first icon which represents a beginning of a milestone event; and
a second icon which represents completion of said milestone event.

8. A computer as in claim 7, in which the display generator is configured to cause the second icon to replace the first icon.

9. A computer as in claim 7, in which the first icon comprises a moving progress indicator.

10. A computer as in claim 3, in which the icons comprise a moving progress indicator which indicates how much of the system program has been loaded.

11. A computer as in claim 1, in which:
the program code is further configured to generate status messages representing warnings; and
the display generator is further configured to generate and transmit warning messages corresponding to the warnings to the display unit.

12. A computer as in claim 11, in which the display generator is configured to generate the warning messages as including instructions for dealing with conditions corresponding to the warnings respectively.

13. A computer as in claim 12, in which the display generator is configured to generate the warning messages as including alphanumeric text.

14. A computer as in claim 12, in which the display generator is configured to generate the warning messages as including prompts for selecting one of a plurality of actions.

15. A digital data storage medium for storing a system program for an electronic digital computer which has a display unit, the system program comprising:
program code configured to generate status messages representing progress advisories and technical advisories as the system program is loaded and run in the computer;
a display generator configured to generate and transmit icons corresponding to status messages representing progress advisories to the display unit;
a message log; and
a logging mechanism configured to store status messages representing technical advisories in the message log.

16. A medium as in claim 15, in which the system program further comprises a message handler configured to receive status messages, determine if they are progress advisories or technical advisories, transmit status messages representing progress advisories to the display generator, and transmit status messages corresponding to technical advisories to the logging mechanism.

17. A medium as in claim 15, in which the status messages representing progress advisories correspond to milestone events in the loading and running of the system program.

18. A medium as in claim 17, in which the status messages and progress icons representing progress advisories are selected to replace a larger number of text status messages.

19. A medium as in claim 17, in which:
the system program comprises a plurality of modules; and
the milestone events correspond to beginning and completion of loading and running selected modules.

20. A medium as in claim 19, in which the modules comprise an operating system and at least one system service module.

21. A medium as in claim 17, in which the icons comprise;
a first icon which represents a beginning of a milestone event; and
a second icon which represents completion of said milestone event.

22. A medium as in claim 21, in which the display generator is configured to cause the second icon to replace the first icon.

23. A medium as in claim 21, in which the first icon comprises a moving progress indicator.

24. A medium as in claim 17, in which the icons comprise a moving progress indicator which indicates how much of the system program has been loaded.

25. A medium as in claim 15, in which:
the program code is further configured to generate status messages representing warnings; and
the display generator is further configured to generate and transmit warning messages corresponding to the warnings to the display unit.

26. A medium as in claim 25, in which the display generator is configured to generate the warning messages as including instructions for dealing with conditions corresponding to the warnings respectively.

27. A medium as in claim 26, in which the display generator is configured to generate the warning messages as including alphanumeric text.

28. A medium as in claim 26, in which the display generator is configured to generate the warning messages as including prompts for selecting one of a plurality of actions.

29. A medium as in claim 15, comprising a magnetic storage unit for storing the system program.

30. A medium as in claim 15, comprising an optical storage unit for storing the system program.

31. A medium as in claim 15, comprising an electronic memory unit for storing the system program.

32. A method for generating an iconic startup message display on a display unit of an electronic digital computer, comprising the steps of:
(a) providing a system program including program code configured to generate status messages representing progress advisories and technical advisories as the system program is loaded and run in a computer;
(b) loading and running the system program in the computer;
(c) generating and transmitting icons corresponding to status messages representing progress advisories to the display unit; and
(d) storing status messages representing technical advisories in a message log.

33. A method as in claim 32, further comprising the steps of:
(e) receiving status messages; and
(f) determining if the status messages are progress advisories or technical advisories.

34. A method as in claim 32, in which step (a) comprises providing the system program such that the status messages representing progress advisories correspond to milestone events in the loading and running of the system program.

35. A method as in claim 34, in which step (a) comprises providing the system program such that the status messages and progress icons representing progress advisories are selected to replace a larger number of text status messages.

36. A method as in claim 34, in which:
   step (a) comprises providing the system program such that it includes a plurality of modules; and
   the milestone events correspond to beginning and completion of loading and running selected modules.

37. A method as in claim 36, in which step (a) comprises providing the system program such that the modules comprise an operating system and at least one system service module.

38. A method as in claim 34, in which step (c) comprises generating the icons as comprising;
   a first icon which represents a beginning of a milestone event; and
   a second icon which represents completion of said milestone event.

39. A method as in claim 38, in which step (c) comprises causing the second icon to replace the first icon.

40. A method as in claim 38, in which step (c) comprises generating the first icon as moving progress indicator.

41. A method as in claim 34, in which step (c) comprises generating the icons as comprising a moving progress indicator which indicates how much of the system program has been loaded.

42. A method as in claim 32, in which:
   step (a) comprises providing the system program such that the program code is further configured to generate status messages representing warnings; and
   the method further comprises the step of:
      (g) generating and transmitting warning messages corresponding to the warnings to the display unit.

43. A method as in claim 42, in which step (g) comprises generating the warning messages as including instructions for dealing with conditions corresponding to the warnings respectively.

44. A method as in claim 43, in which step (g) comprises generating the warning messages as including alphanumeric text.

45. A method as in claim 43, in which step (g) comprises generating the warning messages as including prompts for selecting one of a plurality of actions.

* * * * *